US009880917B2

(12) United States Patent
Schultz et al.

(10) Patent No.: US 9,880,917 B2
(45) Date of Patent: Jan. 30, 2018

(54) MONITORING VIRTUAL MACHINES FOR ALERT CONDITIONS

(71) Applicant: International Business Machines Corporation, Armonk, NY (US)

(72) Inventors: Dale M. Schultz, Falmouth, ME (US); Radhika Sohoni, Dublin (IE); Esmond P. Walshe, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/841,937

(22) Filed: Sep. 1, 2015

(65) Prior Publication Data

US 2017/0060718 A1    Mar. 2, 2017

(51) Int. Cl.

| G06F 11/32 | (2006.01) |
|---|---|
| G06F 13/24 | (2006.01) |
| G06F 11/07 | (2006.01) |
| G06F 11/14 | (2006.01) |
| G06F 11/30 | (2006.01) |
| G06F 9/455 | (2006.01) |

(52) U.S. Cl.
CPC ........ *G06F 11/327* (2013.01); *G06F 9/45558* (2013.01); *G06F 11/0712* (2013.01); *G06F 11/1484* (2013.01); *G06F 11/301* (2013.01); *G06F 13/24* (2013.01); *G06F 2009/45591* (2013.01); *G06F 2201/815* (2013.01); *G06F 2201/86* (2013.01); *G06F 2201/865* (2013.01)

(58) Field of Classification Search
CPC ............. G06F 11/3409; G06F 11/3466; G06F 11/0712; G06F 11/301; G06F 11/0793; G06F 11/3447; G06F 9/45533; G06F 9/445; G06F 9/45558
See application file for complete search history.

(56) References Cited

U.S. PATENT DOCUMENTS

| 7,409,577 B2* | 8/2008 | Wing .................. G06F 11/2025 703/21 |
|---|---|---|
| 7,853,958 B2 | 12/2010 | Mathew et al. |
| 7,913,226 B2 | 3/2011 | Lowell et al. |
| 8,540,518 B2 | 9/2013 | Tharanathan et al. |
| 8,738,972 B1* | 5/2014 | Bakman .............. G06F 11/0712 714/47.1 |
| 8,856,319 B1* | 10/2014 | Huang .................. G06F 9/5077 709/224 |
| 2008/0005748 A1* | 1/2008 | Mathew .............. G06F 11/0712 719/318 |
| 2010/0188230 A1 | 7/2010 | Lindsay |

(Continued)

FOREIGN PATENT DOCUMENTS

WO    2006041643 A2    4/2006

*Primary Examiner* — Nadeem Iqbal
(74) *Attorney, Agent, or Firm* — Jordan IP Law, LLC

(57) ABSTRACT

Methods and systems may provide for detecting an event external to a plurality of virtual machines running on one or more physical machines and determining that the event corresponds to one or more error conditions associated with at least one particular virtual machine in the plurality of virtual machines. Additionally, an alert may be generated in response to at least one of the one or more error conditions. In one example, detecting the event includes detecting an emulated device interrupt associated with the at least one particular virtual machine.

20 Claims, 2 Drawing Sheets

(56) References Cited

U.S. PATENT DOCUMENTS

| | | | | |
|---|---|---|---|---|
| 2010/0235836 A1* | 9/2010 | Bratanov | ............ | G06F 11/3466 |
| | | | | 718/1 |
| 2011/0153838 A1 | 6/2011 | Belkine et al. | | |
| 2013/0227554 A1* | 8/2013 | Tsirkin | ................ | G06F 9/45558 |
| | | | | 718/1 |
| 2014/0201574 A1* | 7/2014 | Manchek | ............ | G06F 11/1407 |
| | | | | 714/38.13 |
| 2014/0372788 A1* | 12/2014 | Vavrick | ............... | G06F 11/0793 |
| | | | | 714/4.1 |
| 2015/0067143 A1 | 3/2015 | Babakhan et al. | | |
| 2015/0121135 A1* | 4/2015 | Pape | .................. | G06F 11/1484 |
| | | | | 714/15 |

* cited by examiner

MONITORING VIRTUAL MACHINES FOR ALERT CONDITIONS

BACKGROUND

Embodiments of the present invention generally relate to virtual machines. More particularly, embodiments relate to monitoring virtual machines for alert conditions.

A virtual machine (VM) may emulate operation of a run-time environment in a physical machine so that an operating system (OS) executing in the VM is unaware of the virtualized environment. In some circumstances, a single individual (e.g., user) may simultaneously use multiple VMs in order to perform different tasks. For example, the user might start a first process on a first VM and then switch to a second VM in order to start a second process or otherwise interact with the second VM. If the first process on the first VM encounters an error, the virtualization agnostic nature of the OS in the first VM may result in the user being unaware of the error while interacting with the second VM.

BRIEF SUMMARY

Embodiments may include a computer program product to monitor virtual machines, the computer program product comprising a computer readable storage medium having program instructions embodied therewith, the program instructions executable by a computer to cause the computer to detect an event external to a plurality of virtual machines running on one or more physical machines, determine that the event corresponds to one or more error conditions associated with at least one particular virtual machine in the plurality of virtual machines, and generate an alert in response to at least one of the one or more error conditions.

Embodiments may also include a method of monitoring virtual machines, comprising detecting an event external to a plurality of virtual machines running on one or more physical machines, determining that the event corresponds to one or more error conditions associated with at least one particular virtual machine in the plurality of virtual machines, and generating an alert in response to at least one of the one or more error conditions.

Embodiments may also include a system to monitor virtual machines, the system comprising a processor and a computer readable storage medium having program instructions embodied therewith, the program instructions executable by the processor to cause the system to detect an event external to a plurality of virtual machines running on one or more physical machines, identify at least one particular virtual machine in the plurality of virtual machines based on the event, wherein the event is to be detected as an emulated device interrupt associated with the particular virtual machine and the emulated device interrupt is to include one or more of an activation of a hardware speaker or an activation of a serial port, determine that the event corresponds to one or more error conditions associated with the particular virtual machine, and generate an alert in response to at least one of the one or more error conditions.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
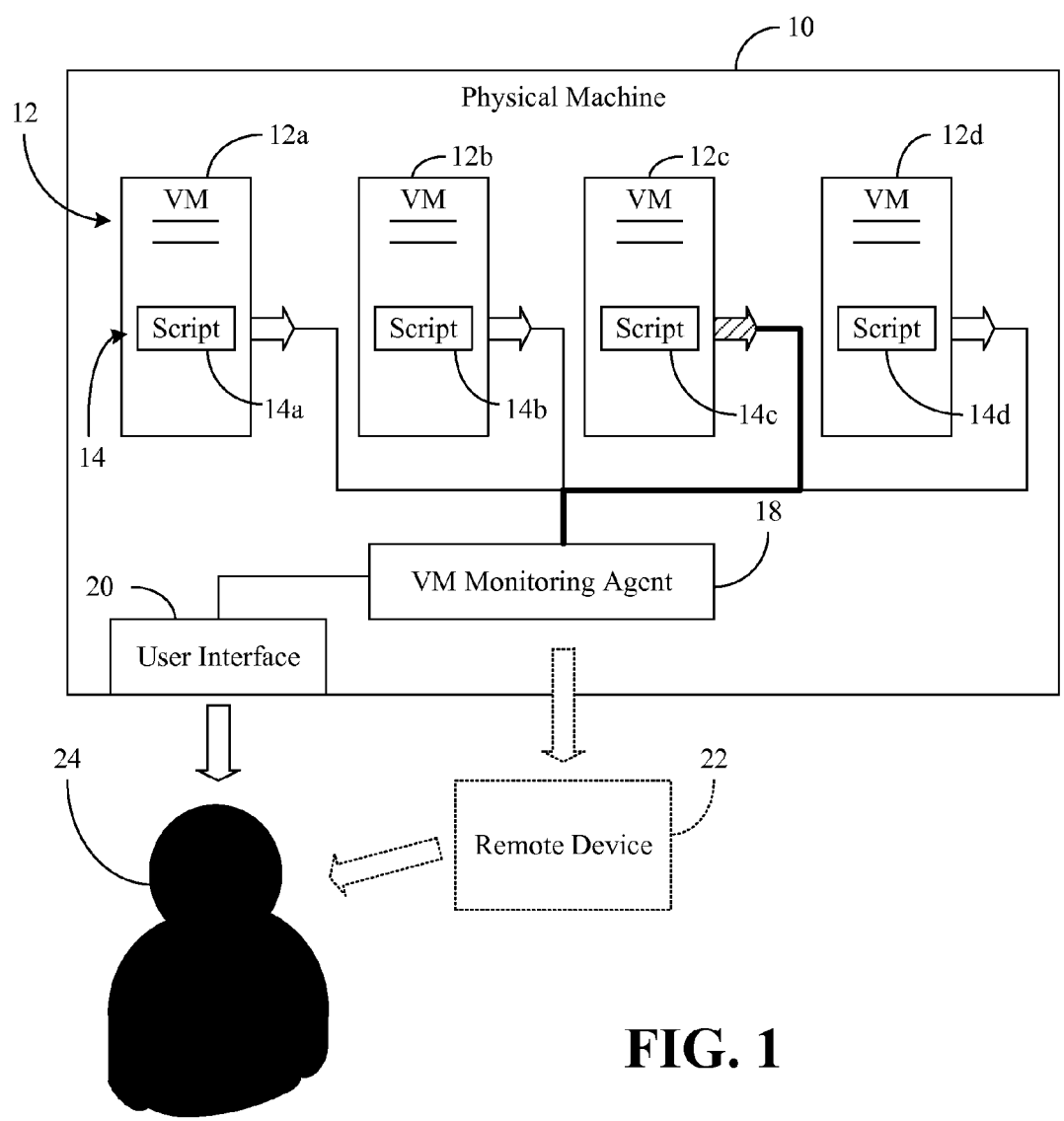
FIG. 1 is a block diagram of an example of a virtualization environment according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in at least one particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a virtualization environment is shown in which a physical machine 10 such as, for example, a server, workstation, desktop computer, notebook computer, tablet computer, etc., includes a plurality of virtual machines 12 (12a-12d). Each virtual machine (VM) 12 may generally emulate operation of a run-time environment the physical machine 10 so that an operating system (OS) executing in the VM 12 is unaware of the virtualized environment. Although a single physical machine 10 is shown, the VMs 12 may be distributed across a plurality of physical machines. For example, one or more of the VMs 12 may be accessed through a remote device 22, desktop, virtual network computing (VNC) system and/or terminal emulator (e.g., PuTTY) that resides in a different geographic location than the illustrated physical machine 10.

In the illustrated example, each VM 12 includes a script 14 (14a-14d) that is configured to generate an external event in response to one or more error conditions arising within the VM 12. As will be discussed in greater detail, the events may take the form of emulated device interrupts such as, for example, hardware speaker activations, serial port (e.g., RS232, Universal Serial Bus/USB) activations, etc., or any combination thereof. For example, a first script 14a might actuate a speaker output port of a first VM 12a in response to encountering an error (e.g., halt condition of a process), a second script 14b may actuate a serial output port of a second VM 12b in response to encountering an error, a third script 14c may actuate another emulated hardware port of a third VM 12c, in response to encountering an error, and so forth.

The physical machine 10 may also include a VM monitoring agent 18 that detects the events external to the plurality of VMs 12. The monitoring agent 18 may determine that an event corresponds to one or more error conditions associated with at least one particular VM 12. For example, the illustrated monitoring agent 18 detects that an event from the third VM 12c corresponds to one or more error conditions associated with the third VM 12c in particular. In such a case, the monitoring agent 18 may generate an alert in response to the one or more error conditions. The alert may be generated via a user interface 20 (e.g., display, speaker, vibratory/haptic unit, etc.) and/or a remote device 22 such as, for example, a handheld device (e.g., smart phone, tablet computer, etc.). The alert might be delivered to the remote device 22 via a text message or other suitable communication link. Upon receiving the alert, a user 24 might switch between VMs 12 to investigate the error condition(s) or otherwise determine the appropriate course of action to take. Thus, the monitoring agent 18 may "hook" into various hardware interrupts in order to collect error information from the plurality of VMs 12.

Figure 2:
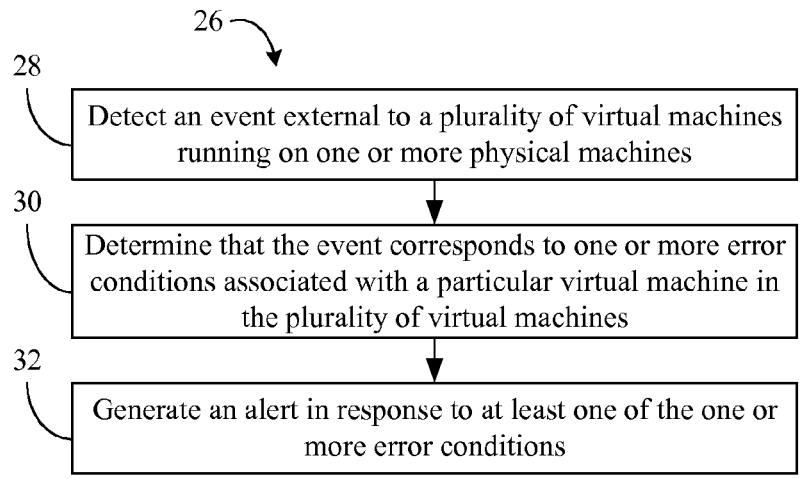
FIG. 2 is a flowchart of an example of a method of monitoring virtualization machines according to an embodiment.

FIG. 2 shows a method 26 of monitoring virtual machines. One or more aspects of the method 26 may generally be implemented by a VM monitoring agent such as, for example, the VM monitoring agent 18 (FIG. 1), already discussed. Illustrated processing block 28 provides for detecting an event external to a plurality of virtual machines running on one or more physical machines. Block 28 may involve, for example, detecting an emulated device interrupt associated with at least one particular virtual machine in the plurality of virtual machines. In one example, the emulated device interrupt includes an activation of a hardware speaker. In another example, the emulated device interrupt includes an activation of a serial port. Other emulated device interrupts may also be used to detect the event.

Block 30 may determine that the event corresponds to one or more error conditions associated with the at least one particular virtual machine. Block 30 may include identifying the at least one particular virtual machine based on the event. For example, the event may include VM identification information (e.g., header information, address information, etc.) that facilitates identification of the at least one particular virtual machine by the monitoring agent. An alert may be generated at block 32 in response to at least one of the one or more error conditions. In one example, the alert is generated via a user interface. The user interface may be associated with at least one of the one or more physical machines, a remote device, etc., or any combination thereof.

Figure 3:
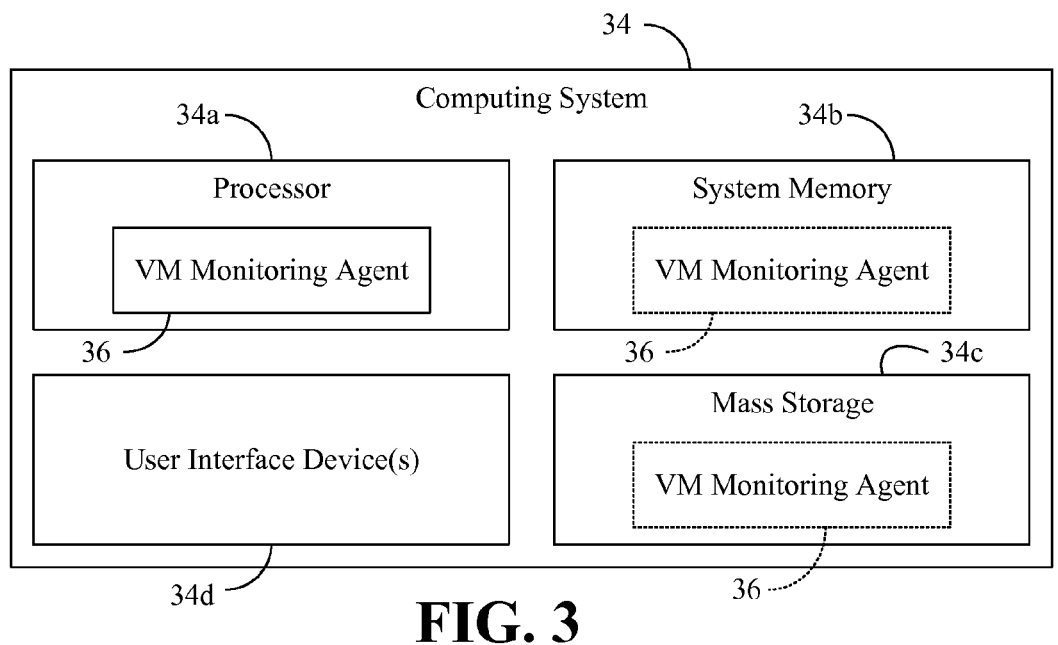
FIG. 3 is a block diagram of an example of a computing system according to an embodiment.

FIG. 3 shows a computing system 34 (34a-34d) that may be used to run virtual machines (not shown). In the illustrated example, a processor 34a operates a VM monitoring agent 36, which may optionally be obtained from system memory 34b and/or mass storage 34c of the computing system 34. The VM monitoring agent 36 may be configured to conduct one or more aspects of the method 26 (FIG. 2), already discussed. Therefore, the VM monitoring agent 36 may detect an event external to a plurality of virtual machines running on the computing system 34, determine that the event corresponds to one or more error conditions associated with at least one particular virtual machine in the plurality of virtual machines, and generate an alert in response to at least one of the one or more error conditions. The computing system 34 may also include one or more user interface devices 34d to present the alert to one or more users of the computing system 34. The alert may also be presented to the user(s) via a remote device (not shown).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system to monitor virtual machines, comprising:
   a processor; and
   a computer readable storage medium having program instructions embodied therewith, the program instructions executable by the processor to cause the system to:
   impose a monitoring agent into hardware interrupts of one or more physical machines by an operating system of a plurality of virtual machines of a virtualized environment, the operating system executing unaware of the virtualized environment;
   detect an event external to the plurality of virtual machines running in a run-time environment of the one or more physical machines, wherein the plurality of virtual machines emulate operation of the run-time environment of the one or more physical machines;
   identify at least one particular virtual machine in the plurality of virtual machines based on the event, wherein the event is to be detected as an emulated device interrupt associated with the at least one particular virtual machine and the emulated device interrupt is to include one or more of an activation of a hardware speaker or an activation of a serial port;
   determine that the event corresponds to one or more error conditions associated with the at least one particular virtual machine; and
   generate, via the monitoring agent imposed into the hardware interrupts, an alert in response to at least one of the one or more error conditions.

2. The system of claim 1, wherein the alert is to be generated via a user interface.

3. The system of claim 2, wherein the user interface is to be associated with at least one of the one or more physical machines.

4. The system of claim 2, wherein the user interface is to be associated with a remote device.

5. A computer program product to monitor virtual machines, the computer program product comprising a computer readable storage medium having program instructions embodied therewith, the program instructions executable by a computer to cause the computer to:
   impose a monitoring agent into hardware interrupts of one or more physical machines by an operating system of a plurality of virtual machines of a virtualized environment, the operating system executing unaware of the virtualized environment;
   detect an event external to the plurality of virtual machines running in a run-time environment of the one or more physical machines, wherein the plurality of virtual machines emulate operation of the run-time environment of the one or more physical machines;
   determine that the event corresponds to one or more error conditions associated with at least one particular virtual machine in the plurality of virtual machines; and
   generate, via the monitoring agent imposed into the hardware interrupts, an alert in response to at least one of the one or more error conditions.

6. The computer program product of claim 5, wherein the event is to be detected as an emulated device interrupt associated with the at least one particular virtual machine.

7. The computer program product of claim 6, wherein the emulated device interrupt is to include an activation of a hardware speaker.

8. The computer program product of claim 6, wherein the emulated device interrupt is to include an activation of a serial port.

9. The computer program product of claim 5, wherein the program instructions are executable by a computer to cause the computer to identify the at least one particular virtual machine based on the event.

10. The computer program product of claim 5, wherein the alert is to be generated via a user interface.

11. The computer program product of claim 10, wherein the user interface is to be associated with at least one of the one or more physical machines.

12. The computer program product of claim 10, wherein the user interface is to be associated with a remote device.

13. A method of monitoring virtual machines, comprising:
   imposing a monitoring agent into hardware interrupts of one or more physical machines by an operating system of a plurality of virtual machines of a virtualized environment, the operating system executing unaware of the virtualized environment;
   detecting an event external to the plurality of virtual machines running in a run-time environment of the one or more physical machines, wherein the plurality of virtual machines emulate operation of the run-time environment of the one or more physical machines;

determining that the event corresponds to one or more error conditions associated with at least one particular virtual machine in the plurality of virtual machines, wherein one or more other virtual machines in the plurality of virtual machines are unaware of the event; and generating, via the monitoring agent being imposed into the hardware interrupts, an alert in response to at least one of the one or more error conditions.

14. The method of claim 13, wherein detecting the event includes detecting an emulated device interrupt associated with the at least one particular virtual machine.

15. The method of claim 14, wherein the emulated device interrupt includes an activation of a hardware speaker.

16. The method of claim 14, wherein the emulated device interrupt includes an activation of a serial port.

17. The method of claim 13, further including identifying the at least one particular virtual machine based on the event.

18. The method of claim 13, wherein the alert is generated via a user interface.

19. The method of claim 18, wherein the user interface is associated with at least one of the one or more physical machines.

20. The method of claim 18, wherein the user interface is associated with a remote device.

* * * * *